United States Patent
Itoh et al.

(10) Patent No.: US 6,795,762 B2
(45) Date of Patent: Sep. 21, 2004

(54) STEERING APPARATUS CONTROLLER FOR ELECTRIC POWER STEERING APPARATUS (75) Inventors: Akira Itoh, Kariya (JP); Masahide Iwazawa, Kariya (JP); Kiyotaka Iwata, Kariya (JP); Yasushi Yamada, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/316,912

(22) Filed: Dec. 12, 2002

(65) Prior Publication Data

US 2003/0120407 A1 Jun. 26, 2003

(30) Foreign Application Priority Data

Dec. 14, 2001 (JP) ......................................... 2001-382201

(51) Int. Cl.[7] .............................. G06F 17/00; B62D 5/06
(52) U.S. Cl. ............................... 701/43; 701/41; 701/42; 180/421; 180/422; 180/443; 180/446
(58) Field of Search .................................. 323/236, 246, 323/249, 319; 361/78, 100, 115; 701/41, 43, 42; 180/417, 421, 422, 443, 446; 318/293, 434, 431, 432, 805, 806, 606; 307/10.1

(56) References Cited

U.S. PATENT DOCUMENTS

| | | | |
|---|---|---|---|
| 5,299,648 A | 4/1994 | Watanabe et al. ............ 180/446 |
| 5,762,159 A * | 6/1998 | Matsuoka et al. ........... 180/422 |
| 6,029,767 A * | 2/2000 | Kifuku ........................ 180/443 |
| 6,226,580 B1 * | 5/2001 | Noro et al. ..................... 701/42 |
| 6,332,506 B1 * | 12/2001 | Kifuku ........................ 180/443 |
| 6,577,024 B2 * | 6/2003 | Kikuta et al. ............... 307/10.1 |
| 6,598,698 B2 * | 7/2003 | Murata et al. ............... 180/443 |
| 2002/0120378 A1 * | 8/2002 | Kawada et al. ................ 701/41 |
| 2002/0166716 A1 * | 11/2002 | Shimizu et al. .............. 180/446 |

FOREIGN PATENT DOCUMENTS

| | | |
|---|---|---|
| EP | 0 276 005 | 7/1988 |
| EP | 1 138 578 | 10/2001 |
| JP | 11-217080 | 8/1999 |
| JP | 2001-278081 | 10/2001 |

\* cited by examiner

Primary Examiner—Jacques H. Louis-Jacques
(74) Attorney, Agent, or Firm—Oblon, Spivak, McClelland, Maier & Neustadt, P.C.

(57) ABSTRACT

A steering apparatus controller for an electric power steering apparatus, which includes an electric motor for generating assist torque for assisting steering of a steering wheel and the steering apparatus controller is designed to execute a feedback control of the applied drive voltage to the electric motor based on the detection result of the actual current that flows through the motor. A sensor detects the actual current to produce the detection result. When detecting an abnormal decrease of the drive voltage of the sensor, a voltage controller maintains the applied voltage to the electric motor at the voltage at a predetermined time before the drive voltage abnormally decreased.

8 Claims, 6 Drawing Sheets

STEERING APPARATUS CONTROLLER FOR ELECTRIC POWER STEERING APPARATUS

BACKGROUND OF THE INVENTION

The present invention relates to a steering apparatus controller for an electric power steering apparatus that applies assist torque to a steering system of a vehicle by a motor.

A typical electric power steering apparatus uses rotational force of an electric motor to assist steering of a steering wheel. In such an electric power steering apparatus, an electric motor applies assist torque that corresponds to the actual steering torque to a steering mechanism when a driver steers the steering wheel.

The electric power steering apparatus includes a steering apparatus controller for controlling the applied voltage (motor drive voltage) to the electric motor. The steering apparatus controller has a motor driving device for driving the electric motor and a central processing unit (CPU) for sending command signals to the motor driving device in accordance with the motor drive voltage.

The steering apparatus controller computes a motor drive current value required for the electric motor to generate the desired assist torque. The steering apparatus controller detects the current (actual current) that actually flows through the electric motor and executes a feedback control to determine the motor drive voltage with reference to the detected value of the actual current.

In the feedback control, if, for example, the actual current detection value decreases for some reason when the steering torque is constant, the steering apparatus controller increases the motor drive voltage to prevent the assist torque from dropping. The feedback control permits the appropriate assist torque to be reliably obtained.

An amplifier that uses, for example, an operational amplifier, is generally located in the device for detecting the actual current. The amplifier amplifies a minute signal sent from the electric motor by a predetermined gain at the operational amplifier and sends the amplified signal to the CPU. Power required for the operational amplifier to amplify the minute signal is supplied to the operational amplifier from the power source. The gain of the amplifier is maintained at a predetermined value by maintaining the voltage supplied to the operational amplifier, or the sensor drive voltage, at a predetermined level due to the structural feature of the operational amplifier.

However, if the sensor drive voltage becomes less than the predetermined level for some reason, it becomes difficult to maintain the gain at the predetermined value and the gain might decrease. In this case, a phenomenon as shown in FIG. 6 is induced.

Figure 6:
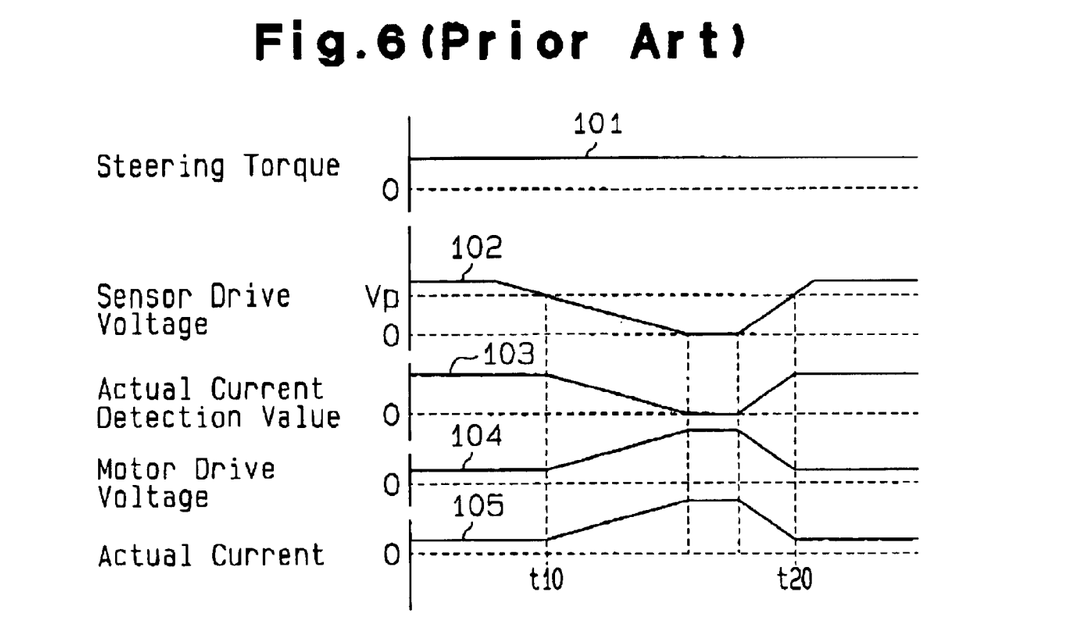
FIG. 6 is a graph showing several characteristics including the sensor drive voltage and the actual current according to a prior art.

FIG. 6 illustrates the relationship among the steering torque 101, the sensor drive voltage 102, the actual current detection value 103, the motor drive voltage 104, and the actual current value 105, which actually flows through the motor. In FIG. 6, the steering torque 101 is constant with respect to the temporal transition.

As shown in FIG. 6, if the sensor drive voltage 102 starts to decrease for some reason and become less than a predetermined voltage Vp, the actual current detection value 103 decreases (t10 to t20) according to the decrease of the gain of the operational amplifier although the steering torque is not changed. The voltage Vp is a minimum voltage value required for amplifying the signal with the normal gain at the operational amplifier.

When the actual current detection value 103 decreases, the steering apparatus controller increases the motor drive voltage 104 to prevent the assist torque from dropping. This increases the actual current value 105.

In this case, since the steering torque is not actually changed, the increase of the current value of the actual current causes the electric motor to generate excessive assist torque. Since the excessive assist torque turns the steering wheel excessively, the steering torque, for example, might be applied to the torque sensor, which detects the steering torque, in the direction opposite to the direction that the driver has been applying the steering torque. If the steering torque is applied to the torque sensor in the opposite direction, the steering apparatus controller reverses the rotational direction of the electric motor. If this is repeated, the steering mechanism causes vibration, which deteriorates the steering feeling.

SUMMARY OF THE INVENTION

The objective of the present invention is to provide a steering apparatus controller for an electric power steering apparatus that prevents deterioration of the steering feeling due to vibration of a steering mechanism.

To achieve the above objective, the present invention provides a steering apparatus controller for an electric power steering apparatus. The steering apparatus controller executes a feedback control of an applied voltage to an electric motor. The electric motor generates assist torque for assisting steering of a steering wheel. The assist torque is based on a detection result of an actual current that flows through the electric motor. The steering apparatus controller includes a sensor and a voltage controller. The sensor detects the actual current. When the sensor detects an abnormal decrease of a drive voltage of the sensor, the voltage controller maintains the applied voltage to the electric motor to a drive voltage at a predetermined time before the drive voltage abnormally decreased.

The present invention also provides a controlling method for an electric power steering apparatus. A steering apparatus controller executes a feedback control of an applied voltage to an electric motor. The electric motor generates assist torque for assisting steering of a steering wheel based on a detection result of an actual current that flows through the electric motor. The detected actual current is detected by a sensor. The method includes: detecting an abnormal decrease of a drive voltage of the sensor; and when detecting an abnormal decrease of the drive voltage of the sensor, maintaining the applied drive voltage to the electric motor to a drive voltage at a predetermined time before the drive voltage abnormally decreased.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A steering apparatus controller according to a preferred embodiment of the present invention will now be described with reference to FIGS. 1 to 5, 7, and 8. The steering apparatus controller is used for an electric power steering apparatus mounted on an automobile.

Figure 1:
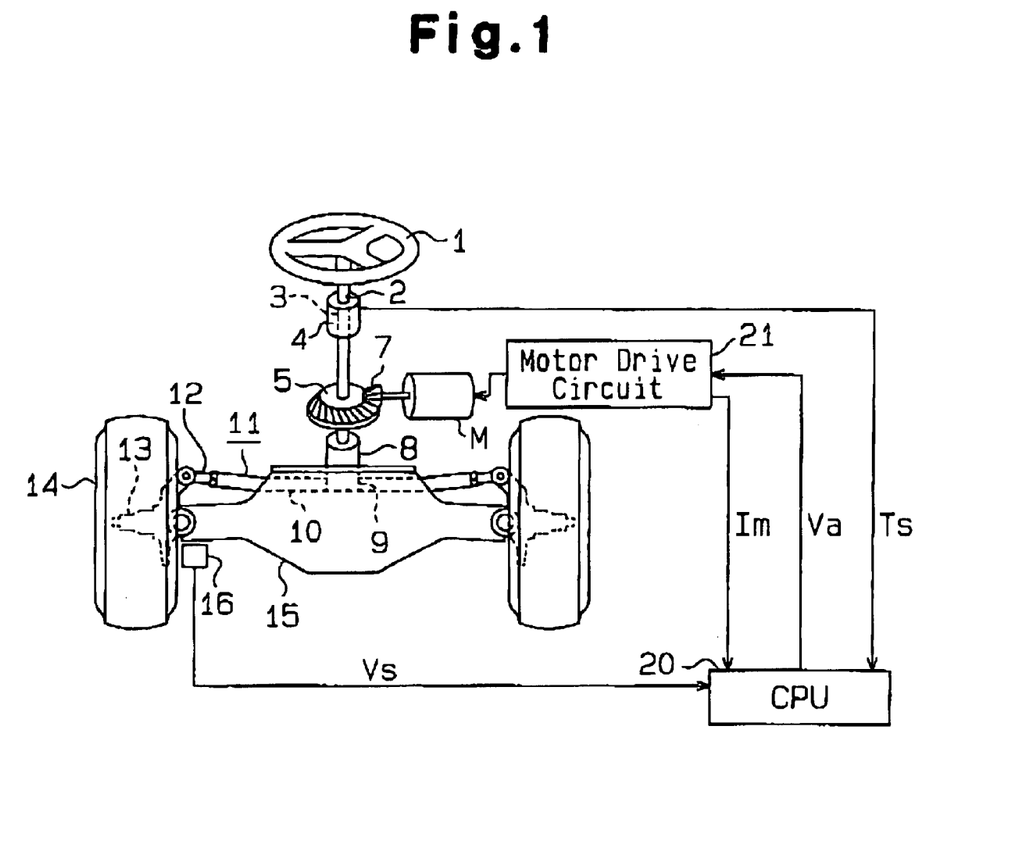
FIG. 1 is a schematic view illustrating a control apparatus for an electric power steering apparatus according to a preferred embodiment of the present invention.

FIG. 1 is a schematic view of the electric power steering apparatus and the steering apparatus controller.

The electric power steering apparatus includes a steering wheel 1, a steering shaft 2, which is coupled to the steering wheel 1, and a torsion bar 3. A torque sensor 4 is attached to the torsion bar 3. When the steering shaft 2 is rotated and force is applied to the torsion bar 3, the torsion bar 3 is twisted according to the strength of the force. The torque sensor 4 detects the twist, or the steering torque Ts applied to the steering wheel 1. The torque sensor 4 sends a signal representing the steering torque Ts to a central processing unit (CPU) 20.

A reduction gear 5 is attached to the steering shaft 2. The reduction gear 5 is engaged with a gear 7, which is attached to a rotary shaft of an electric motor M.

Further, a pinion shaft 8 is attached to the reduction gear 5. A pinion 9 is secured to the distal end of the pinion shaft 8. The pinion 9 engages with a rack 10. The rack 10 and the pinion 9 constitute a rack-and-pinion mechanism 11.

A tie rod 12 is secured to each end of the rack 10. A knuckle 13 is rotatably coupled to one of the distal ends of each tie rod 12. Each knuckle 13 is secured to one of front wheels 14. One end of each knuckle 13 is rotatably coupled to one of the ends of a cross member 15. When the motor M is rotated, the rotational speed of the motor M is reduced by the reduction gear 5 and transmitted to the rack 10. Accordingly, the rack 10 changes the direction of the front wheels 14 via the tie rods 12 and the knuckles 13. Thus, the traveling direction of the vehicle is changed.

A vehicle speed sensor 16 is arranged at one of the front wheels 14. The vehicle speed sensor 16 sends detection signals corresponding to the rotational speed of the front wheels 14 to the CPU 20. The detection signals represent the vehicle speed Vs.

In the preferred embodiment, the CPU 20 determines a drive voltage command value Va to be sent to a motor drive circuit 21 based on signals representing the steering torque Ts and the vehicle speed Vs sent from the torque sensor 4 and the vehicle speed sensor 16. The motor drive circuit 21 sends drive current corresponding to the drive voltage command value Va sent from the CPU 20 to the motor M. The motor M generates torque for assisting a driver to steer the steering wheel 1.

In the preferred embodiment, the motor drive circuit 21 includes a current sensor 22 (see FIG. 3) for detecting the drive current that actually flows through the motor M. A signal representing the actual current detection value Im is sent to the CPU 20. The drive voltage command value Va, or the applied voltage (motor drive voltage) to the motor M, is feedback-controlled by the CPU 20 based on the detection result of the actual current detection value Im of the motor M.

If, for example, the actual current detection value Im decreases for some reason when the steering torque Ts is constant, the CPU 20 increases the motor drive voltage to prevent the assist torque from dropping.

In the preferred embodiment, the CPU 20 and the motor drive circuit 21 constitute the steering apparatus controller.

The functions and operations of the steering apparatus controller will now be described with reference to block diagrams shown in FIGS. 2 and 3. The CPU 20 executes a program stored in a read only memory (ROM), which is not shown, located in the steering apparatus controller. The program may be recorded on a recording medium such as a magnetic disk.

Figure 2:
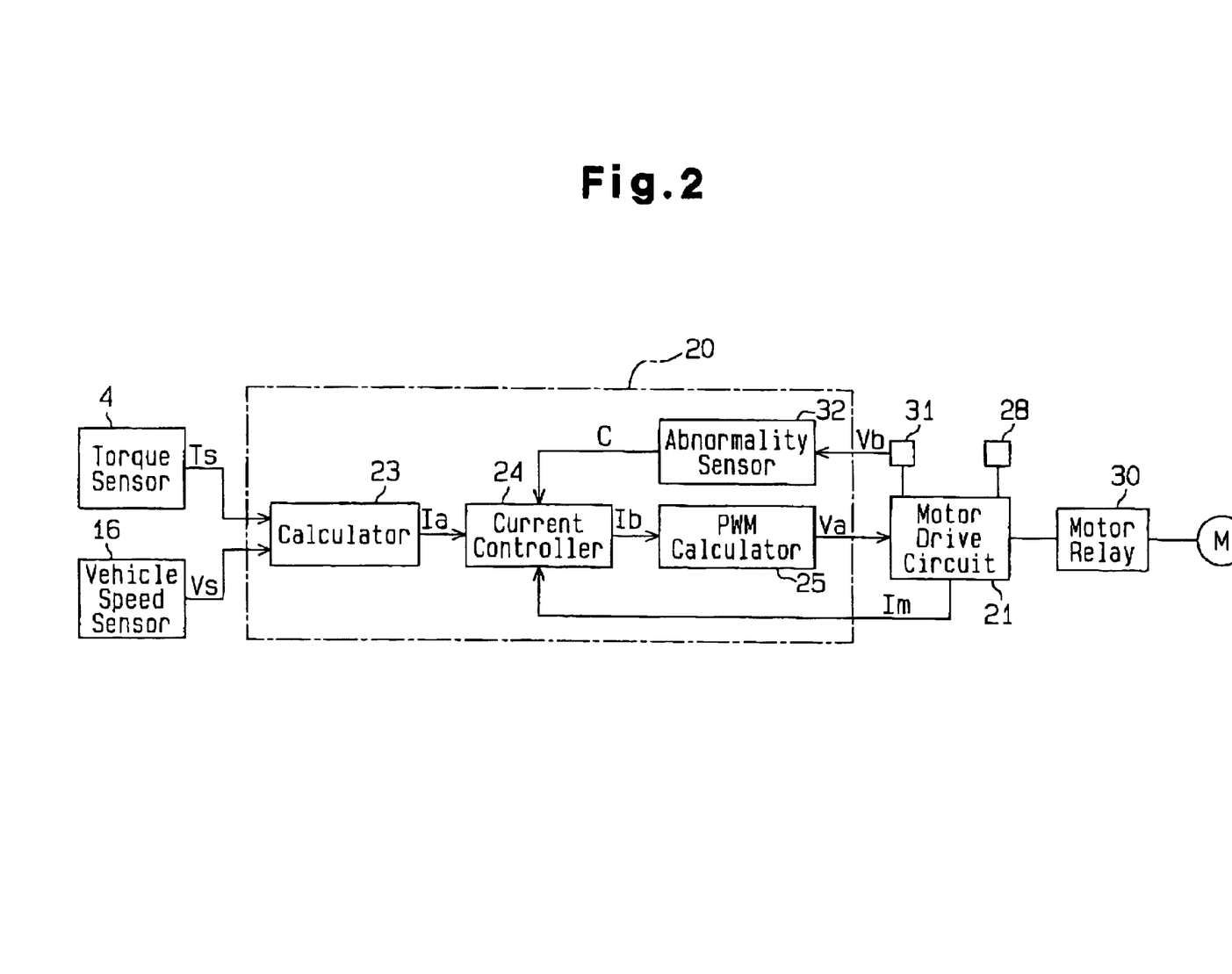
FIG. 2 is a control block diagram illustrating the control apparatus for the electric power steering apparatus shown in FIG. 1.

As shown in FIG. 2, the CPU 20 receives the steering torque Ts and the vehicle speed Vs sent from the torque sensor 4 and the vehicle speed sensor 16. The CPU 20 computes an actual current command value Ia to be sent to the motor M based on the steering torque Ts and the vehicle speed Vs by a current command value calculator 23 and sends the actual current command value Ia to a current controller 24.

The CPU 20 receives the actual current detection value Im sent from the motor drive circuit 21 and computes the current command value Ib of the normal state based on the present current command value Ia and the actual current detection value Im to generate assist torque appropriate for the steering torque Ts and the vehicle speed Vs. The CPU 20 then sends the computed current command value Ib to a pulse width modulation (PWM) calculator 25. At this time, the CPU 20 stores the current command value Ib in a RAM (not shown) located in the steering apparatus controller.

At the receipt of the current command value Ib of the normal state, the CPU 20 performs a PWM calculation based on the current command value Ib at the PWM calculator 25. The CPU 20 sends the calculation result to the motor drive circuit 21 as the drive voltage command value Va As a result, the motor M is controlled via the motor drive circuit 21. Thus, the motor M exerts appropriate assist torque according to the detected steering torque Ts and the vehicle speed Vs.

Figure 3:
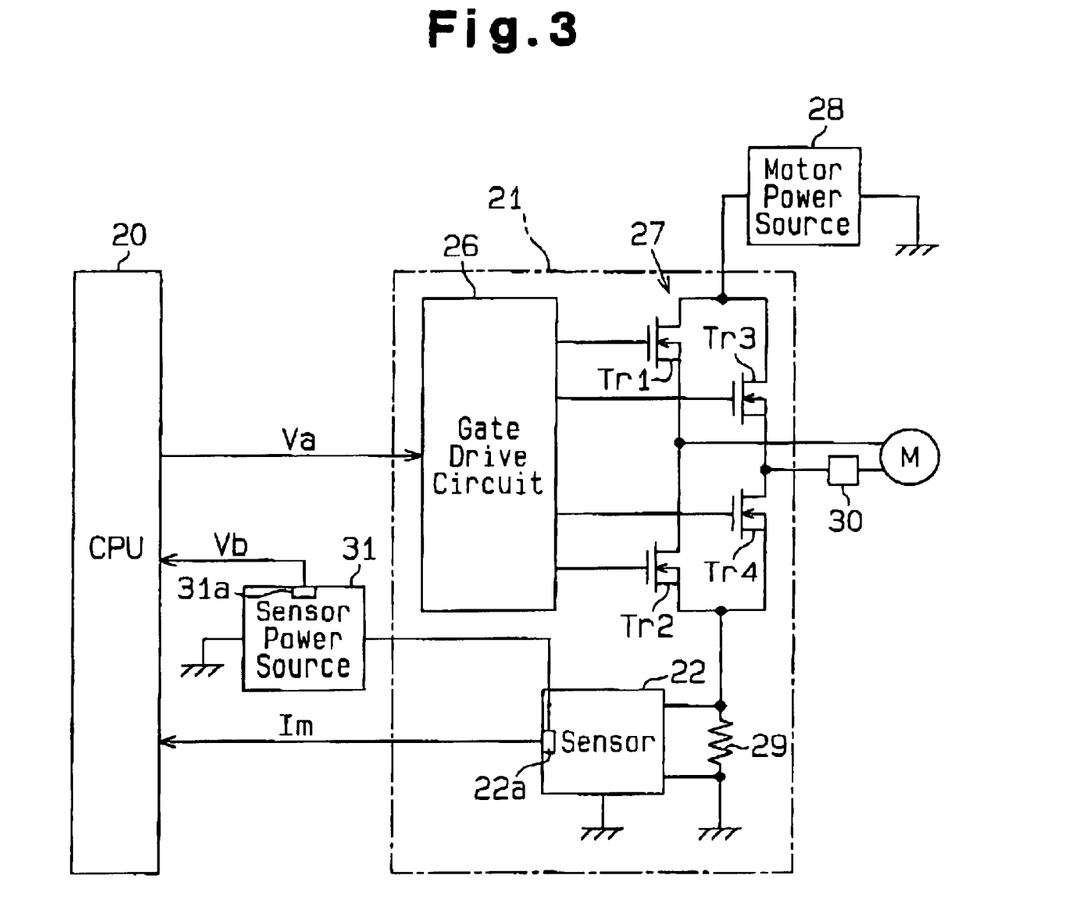
FIG. 3 is a block diagram illustrating the motor drive circuit according to the preferred embodiment.

As shown in FIG. 3, the motor drive circuit 21 includes a gate drive circuit 26 and a bridge circuit 27. The gate drive circuit 26 receives the drive voltage command value Va sent from the PWM calculator 25 of the CPU 20, The bridge circuit 27 includes first to fourth transistors Tr1, Tr2, Tr3, and Tr4, each consisting of MOS-FETs (Field Effect Transistors). In the preferred embodiment, the first transistor Tr1 and the second transistor Tr2 are serially connected to each other and the third transistor Tr3 and the fourth transistor Tr4 are serially connected to each other. Two sets of serial transistors are connected in parallel.

A motor power source 28 is connected to the node between the first transistor Tr1 and the third transistor Tr3. The node between the second transistor Tr2 and the fourth transistor Tr4 is grounded via a resistor 29. Further, the motor M is connected to the bridge circuit 27 between the node of the first and second transistors Tr1, Tr2 and the node of the third and fourth transistors Tr3, Tr4. The node between the third transistor Tr3 and the fourth transistor Tr4 is connected to the motor M via a power discontinuing device, which is a motor relay 30. The motor relay 30 is connected to the CPU 20 via a relay drive circuit, which is not shown, located in the steering apparatus controller.

The gate drive circuit 26 is constituted by, for example, a pulse width modulation circuit, a logical circuit, and the like. The gate drive circuit 26 supplies voltage to each of the transistors Tr1 to Tr4 in accordance with the drive voltage command value Va sent from the CPU 20 to control the drive current to the motor M, or the rotational direction and the drive torque (rotational angle) of the motor M.

For example, if the drive voltage command value Va is assigned when the rotational direction of the motor M is clockwise, the gate drive circuit 26 supplies voltage to the gate terminals of the second and third transistors Tr2 and Tr3. Accordingly, current flows to the third transistor Tr3, the motor M, and the second transistor Tr2 in this order causing the motor M to rotate clockwise.

On the contrary, when the rotational direction of the motor M is counterclockwise, the gate drive circuit 26 supplies voltage to the gate terminals of the first and fourth transistors Tr1 and Tr4. Accordingly, current flows to the first transistor Tr1, the motor M, and the fourth transistor Tr4 in this direction causing the motor M to rotate counterclockwise.

As described above, the CPU 20 controls the direction and level of current that flows to the motor M to control the rotational direction and the drive torque of the motor M. In the case of either rotational directions, the amount of current that is the same as the current actually flowing through the motor M flows through the resistor 29 while the motor M is rotated by the voltage supply from the gate drive circuit 26.

In addition to stopping the current supply to the motor M from the motor drive circuit 21, the path between the bridge circuit 27 and the motor M may be discontinued by the motor relay 30 to stop the motor M. When the path is discontinued by the motor relay 30, the counterflow of current to the bridge circuit 27 is prevented from being caused by the counter electromotive force of the motor.

The current sensor 22 has an amplifier 22a that uses, for example, an operational amplifier for amplifying input signals from terminals connected to both ends of the resistor 29. The current sensor 22 amplifies the signals from the terminals with a predetermined gain at the amplifier 22a and sends the amplified signals to the CPU 20 as the actual current detection value Im.

The current sensor 22 is connected to a sensor power source 31, which is a power source for permitting the amplifier 22a to amplify signals, or driving the current sensor 22. The gain of the current sensor 22 is maintained at a predetermined value by keeping the power source voltage (sensor drive voltage Vb) at a predetermined level, or at a reference voltage Vd due to the structural feature of the operational amplifier used in the amplifier 22a.

The sensor power source 31 has a voltage sensor 31a for detecting the voltage of the sensor power source 31. The voltage sensor 31a sends signals concerning the sensor drive voltage Vb to the CPU 20.

As shown in FIG. 2, the CPU 20 has an abnormality sensor 32. The abnormality sensor 32 and the voltage sensor 31a form abnormality detection means for the sensor drive voltage. When the abnormality sensor 32 receives the sensor drive voltage Vb sent from the voltage sensor 31a, the CPU 20 compares the sensor drive voltage Vb with the reference voltage Vd. Then, the CPU 20 sends a signal C concerning the comparison result to the current controller 24.

If the signal C represents that the sensor drive voltage Vb is less than the reference voltage Vd, it is determined abnormal at the current controller 24, and the CPU 20 executes a control that is different from the feedback control executed in the normal state, in which the sensor drive voltage Vb is greater than or equal to the reference voltage Vd. That is, the CPU 20 controls the level of the applied voltage to the motor M to be maintained at the level before the abnormality occurs and when the drive voltage Vb is normal. The CPU 20 replaces the current command value Ib to be sent to the PWM calculator 25 with the current command value Ib, which is stored in the RAM at a predetermined time in the normal state before the abnormality occurs. Thus, the current command value Ib is maintained constant. This prevents the assist torque from increasing excessively due to the decrease of the gain of the current sensor 22.

The current controller 24, the PWM calculator 25, and the motor drive circuit 21 constitute a voltage controller.

The CPU 20 includes an abnormality detection timer (not shown) and a normality detection timer (not shown). The abnormality detection timer calculates the time elapsed from when the abnormality of the drive voltage of the current sensor 22 is caused. The normality detection timer calculates the time elapsed from when the drive voltage of the current sensor is restored from the abnormal state to the normal state.

Figure 4:
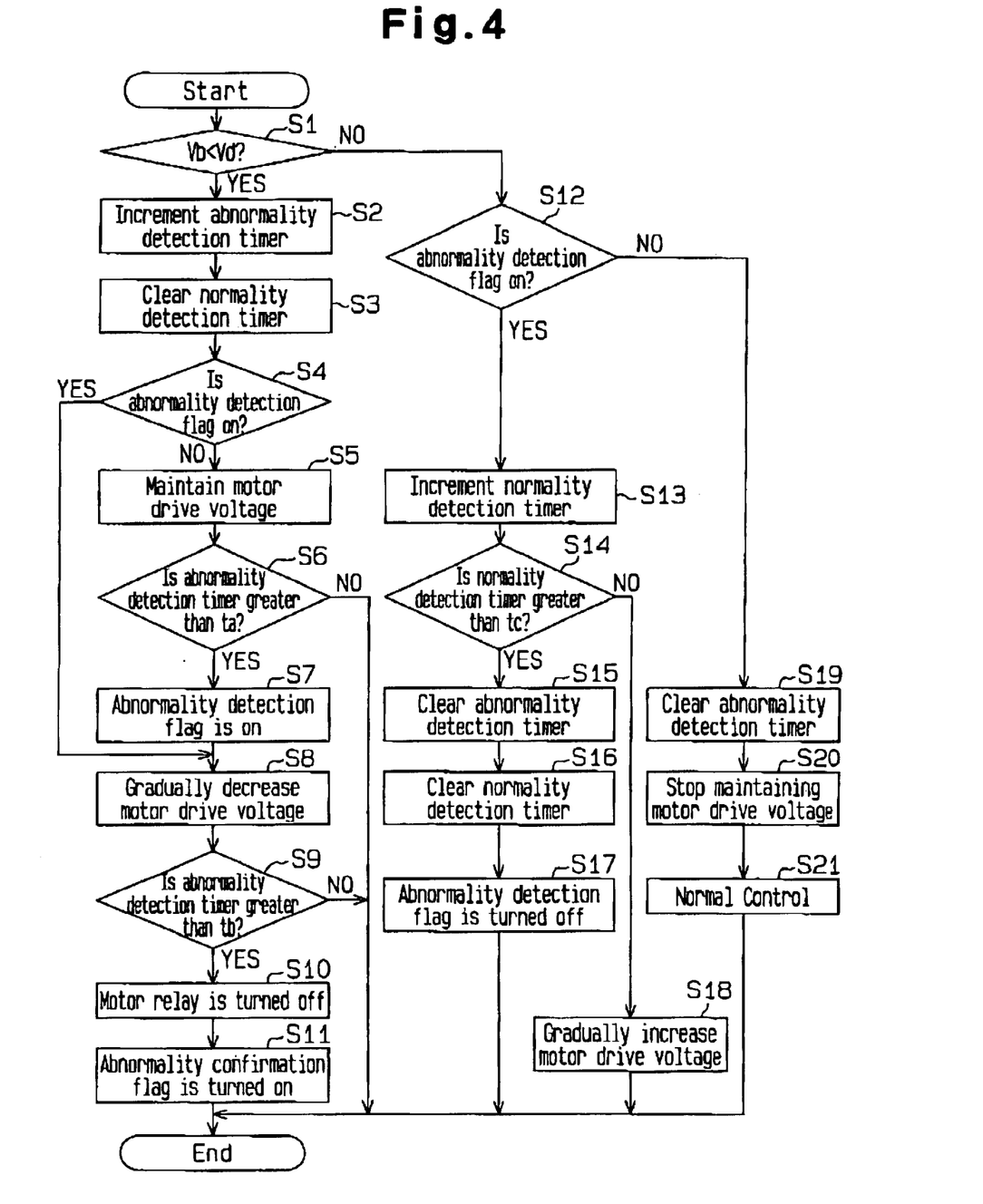
FIG. 4 is a control flowchart of a central processing unit according to the preferred embodiment.

The operations of the above mentioned electric power steering apparatus will now be described with respect to the program processing operation of the CPU 20 with reference to a flowchart shown in FIG. 4.

In step S1, the CPU 20 compares the sensor drive voltage Vb with the reference voltage Vd. If it is determined that the sensor drive voltage Vb is less than the reference voltage Vd, the CPU 20 determines it is abnormal and proceeds to step S2.

In step S2, the CPU 20 increments the abnormality detection timer. In step S3, the CPU 20 clears the normality detection timer and sets the elapsed time to zero.

In step S4, the CPU 20 determines whether an abnormality detection flag is on. If it is determined that the abnormality detection flag is off, the CPU 20 proceeds to step S5.

In step S5, the CPU 20 maintains the level of the motor drive voltage to the level at the predetermined time in the normal state before the abnormality occurs.

In step S6, the CPU 20 compares and determines whether the cumulative time of the abnormality detection timer is greater than a predetermined time ta. If it is determined that the cumulative time is less than or equal to the predetermined time ta, the CPU 20 terminates the routine to return to step S1. On the other hand, if it is determined that the cumulative time is greater than the predetermined time ta, the CPU 20 proceeds to step S7. In step S7, the CPU 20 turns the abnormality detection flag on and stores the result in the RAM.

On the other hand, if it is determined that the abnormality detection flag is on in step S4, the CPU 20 determines that a gradual decrease process of the motor drive voltage has already been performed in the former routine. Thus, the CPU 20 skips steps S5 to S7 and proceeds to step S8. In step S8, the CPU 20 starts the gradual decrease process of the motor drive voltage for this routine. In the gradual decrease process, the current controller 24 computes and sends the current command value Ib to the PWM calculator 25 such that the motor drive voltage is gradually decreased.

In step S9, the CPU 20 determines whether the cumulative time of the abnormality detection timer is greater than a predetermined time tb (ta<tb). If it is determined that the cumulative time is less than or equal to the predetermined time tb, the CPU 20 terminates the routine to return to step S1. On the other hand, if it is determined that the cumulative time is greater than the predetermined time tb, the CPU 20 proceeds to step S10.

In step S10, the CPU 20 turns off the motor relay 30 and discontinues the path between the motor drive circuit 21 and the motor M.

In step S11, the CPU 20 turns on an abnormality confirmation flag and stores the result in the RAM, and then terminates the control procedure of the motor M.

If it is determined that the sensor drive voltage Vb is greater than or equal to the reference voltage Vd in step S1, the CPU 20 determines it is normal and proceeds to step S12.

In step S12, the CPU 20 determines whether the abnormality detection flag is on. If it is determined that the abnormality detection flag is on, the CPU 20 determines that the sensor drive voltage Vb is restored from the abnormal state to the normal state, and proceeds to step S13. In step S13, the CPU 20 increments the normality detection timer.

In step S14, the CPU 20 determines whether the cumulative time of the normality detection timer is greater than a predetermined time tc. In this embodiment, the predetermined time tc is less than the predetermined time ta (tc<ta). If it is determined that the cumulative time is greater than the predetermined time tc, the CPU 20 proceeds to step S15. In step S15, the CPU 20 clears the abnormality detection timer. Then, in step S16, the CPU 20 clears the normality detection timer. In step S17, the CPU 20 turns off the abnormality detection flag and stores the result in the RAM.

On the other hand, if it is determined that the cumulative time is less than or equal to the predetermined time tc in step S14, the CPU 20 proceeds to step S18 and gradually increases the motor drive voltage. In this process, the current controller 24 computes and sends the current command value Ib to the PWM calculator 25 such that the motor drive voltage is gradually increased. The upper limit of the current command value Ib calculated in this control procedure to gradually increase the motor drive voltage is set to the current command value Ia sent from the current command value calculator 23.

If it is determined that the abnormality detection flag is off in step S12, the CPU 20 proceeds to step S19 and clears the abnormality detection timer. In step S20, the CPU 20 stops maintaining the motor drive voltage. In step S21, the CPU 20 executes the normal feedback control.

Figure 5:
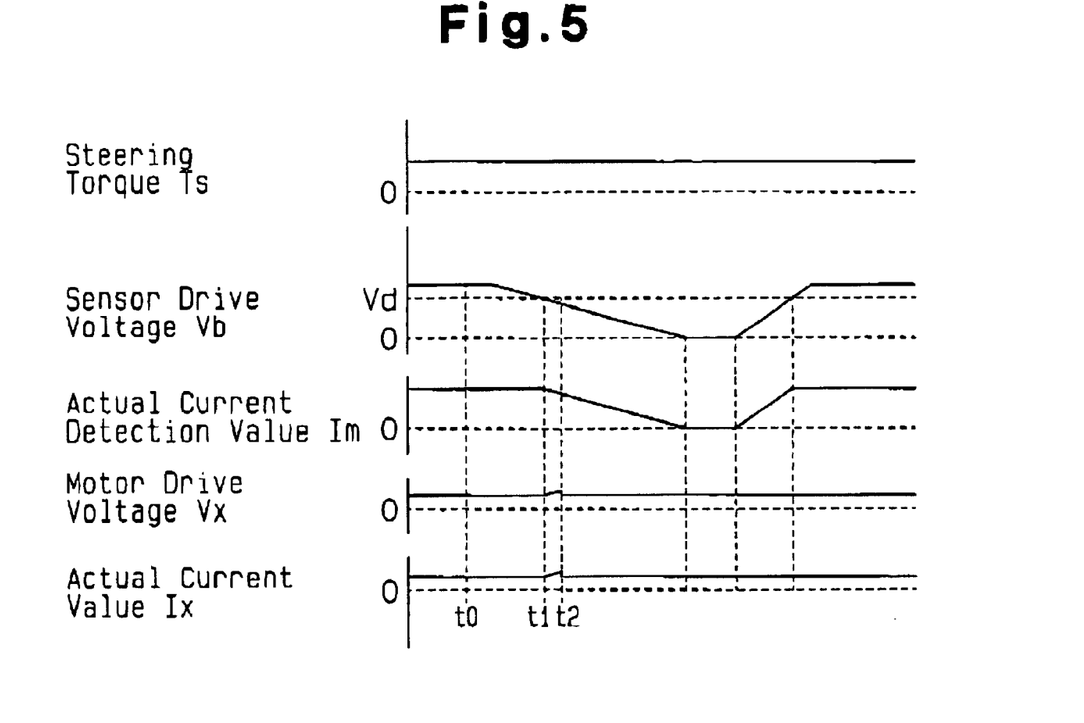
FIG. 5 is a graph showing the relationship between the sensor drive voltage and several characteristics including the actual current value according to the preferred embodiment.

FIG. 5 shows the relationship among the steering torque Ts, the sensor drive voltage Vb, the actual current detection value Im, the motor drive voltage, and the current actually flowing through the motor M (actual current value) during the control procedure for maintaining the motor drive voltage. The steering torque Ts and the vehicle speed Vs are constant with respect to the temporal transition.

As shown in FIG. 5, if the sensor drive voltage Vb starts to decrease for some reason and become less than the reference voltage Vd (time t1), the actual current detection value Im starts to decrease according to the decrease of the gain of the amplifier 22a. At this time, although the actual current detection value Im decreases, the CPU 20 determines that the sensor drive voltage Vb has become less than the reference voltage Vd. Thus, the motor drive voltage is controlled to be maintained to a value at a predetermined time (for example, time t0) in the normal state before the time t1. Accordingly, the actual current value is maintained to a value at the predetermined time, which prevents the assist torque from excessively increasing above the required amount.

The motor drive voltage Vx slightly increases during a short time from the time t1 to a time t2 at which the motor drive voltage Vx is maintained to a value at the predetermined time in the normal state by the CPU 20, and the actual current value Ix slightly increases accordingly as shown in FIG. 5. However, the increase of the assist torque is not enough to induce the deterioration of the steering feeling.

Figure 7:
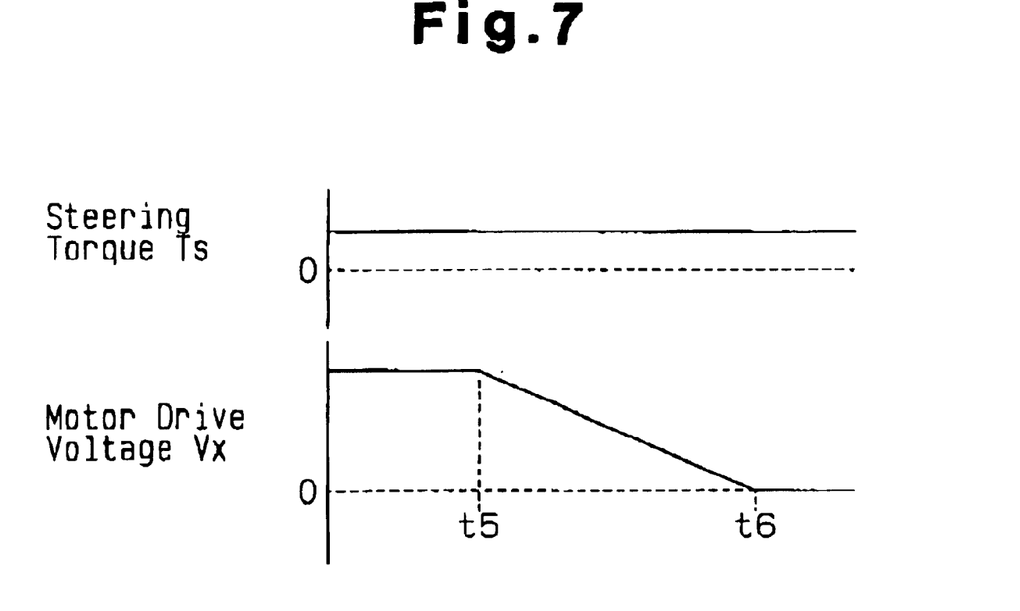
FIG. 7 is a graph showing the characteristics of the motor drive voltage according to the preferred embodiment.
Figure 8:
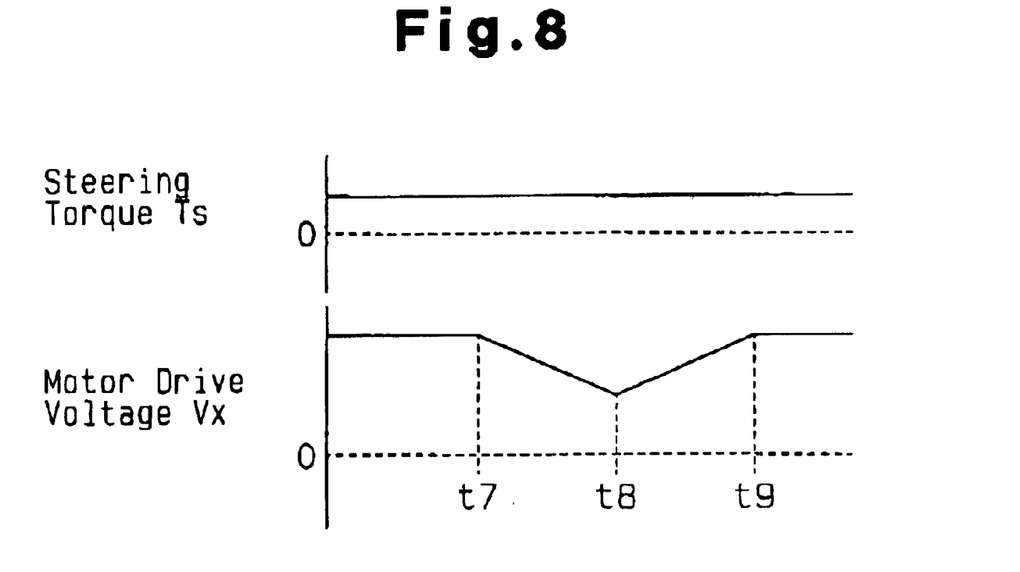
FIG. 8 is a graph showing the characteristics of the motor drive voltage according to the preferred embodiment.

FIG. 7 shows the characteristics of the steering torque Ts and the motor drive voltage Vx during the control procedure of the CPU 20 for gradually decreasing the motor drive voltage Vx. FIG. 8 shows the characteristics of the steering torque Ts and the motor drive voltage Vx during the control procedures of the CPU 20 for gradually decreasing and gradually increasing the motor drive voltage Vx. The steering torque Ts and the vehicle speed Vs are constant with respect to the temporal transition.

When it is determined that the sensor drive voltage Vb is less than the reference voltage Vd, and the cumulative time of the abnormal detection timer is greater than the predetermined time ta, the CPU 20 gradually decreases the motor drive voltage (during time t5 to t6) by repeatedly performing tile gradual decrease process of the motor drive voltage. FIG. 7 shows a state in which the motor drive voltage is decreased to zero before the cumulative time of the abnormal detection timer exceeds the predetermined time tb, or before the motor relay 30 is turned off.

FIG. 8 shows that by repeating the gradual decrease process of the motor drive voltage, the motor drive voltage Vx gradually decreases during time t7 and time t8. When the sensor drive voltage Vb becomes greater than or equal to the reference voltage value Vd, the motor drive voltage Vx is gradually increased during time t8 to t9 by repeating the gradual increase process. The gradual increase process of the motor drive voltage Vx is repeated until the current command value Ib calculated in the gradual increasing process becomes equal to the current command value Ia.

The present invention provides the following advantages.

(1) When the abnormality sensor 32 detects an abnormal decrease of the sensor drive voltage Vb, the applied voltage to the motor M (motor drive voltage Vx) is maintained to the voltage at the predetermined time before the abnormal decrease occurs. In this case, although the actual current detection value Im decreases due to the abnormal decrease of the sensor drive voltage Vb, the abnormality sensor 32 detects the abnormal decrease of the sensor drive voltage Vb. Thus, the motor drive voltage Vx is maintained to the voltage at the predetermined time before the abnormal decrease occurs. That is, since the motor drive voltage Vx is prevented from being increased by the feedback control based on the actual current detection value Im, the assist torque is prevented from being excessively generated by the motor M. Therefore, the steering feeling is prevented from deteriorating due to the excessive increase of the assist torque.

In the preferred embodiment, when the cumulative time of the abnormality detection timer exceeds the predetermined time tb, or when the abnormal decrease of the sensor drive voltage Vb is continued over the predetermined time, the motor relay 30 is turned off while preventing the motor drive voltage Vx from being increased by the feedback control. That is, the steering feeling is prevented from deteriorating from when the abnormality occurs until the motor relay 30 is turned off.

(2) When the motor drive voltage is maintained constant for a predetermined time period, the voltage controller gradually decreases the motor drive voltage. That is, the motor M is stopped without rapidly changing the assist torque.

(3) When the sensor drive voltage Vb restores from the abnormally decreased state to the normal state while the motor drive voltage is gradually decreased, the voltage controller gradually increases the motor drive voltage. That is, the control procedure of the motor M is shifted to the normal feedback control without rapidly changing the assist torque.

(4) Power is supplied to the motor M via the motor relay 30. In this case, the counterflow of current caused by counter electromotive force of the motor M is prevented.

It should be apparent to those skilled in the art that the present invention may be embodied in many other specific forms without departing from the spirit or scope of the invention. Particularly, it should be understood that the invention may be embodied in the following forms.

The voltage of the sensor power source 31 need not be directly detected by the voltage sensor 31a.

The transistors Tr1 to Tr4 of the bridge circuit 27 need not consist of MOS-FETs. Other switching elements may be use as long as the elements can be used for controlling the rotational direction or drive force of the motor M.

The motor M need not be a direct current motor. For example, a brushless type motor or a linear motor may be used.

The voltage controlling means may be designed such that in the case, in which the sensor drive voltage Vb is restored from the abnormally decreased state to the normal state while the motor drive voltage is gradually decreased, the motor drive voltage is gradually increased if the normal state is continued for a predetermined time period or more.

Therefore, the present examples and embodiments are to be considered as illustrative and not restrictive and the invention is not to be limited to the details given herein, but may be modified within the scope and equivalence of the appended claims.

What is claimed is:

1. A steering apparatus controller for an electric power steering apparatus, wherein the steering apparatus controller executes a feedback control of an applied voltage to an electric motor, which electric motor generates assist torque for assisting steering of a steering wheel, said assist torque being based on a detection result of an actual current that flows through the electric motor, the steering apparatus controller comprising:
  a voltage source;
  a sensor adapted to detect the actual current, and outputting a signal using a drive voltage from the voltage source; and
  a voltage controller adapted to control a voltage applied to the electric motor, wherein, when said voltage controller detects an abnormal decrease of the drive voltage inputted to the sensor, the voltage controller maintains the applied voltage to the electric motor at a drive voltage value present at a predetermined time before the detection of the abnormally decreased drive voltage.

2. The steering apparatus controller for an electric power steering apparatus according to claim 1, wherein, when the applied voltage to the electric motor is maintained constant for a predetermined time period, the voltage controller gradually decreases the applied voltage.

3. A steering apparatus controller for an electric power steering apparatus, wherein the steering apparatus controller executes a feedback control of an applied voltage to an electric motor, which electric motor generates assist torque for assisting steering of a steering wheel, said assist torque being based on a detection result of an actual current that flows through the electric motor, the steering apparatus controller comprising:
  a sensor for detecting the actual current; and
  a voltage controller, wherein when said voltage controller detects an abnormal decrease of a drive voltage for the sensor, the voltage controller maintains the applied voltage to the electric motor at a drive voltage value present at a predetermined time before the detection of the abnormally decreased drive voltage, wherein when the applied voltage to the electric motor is maintained constant for a predetermined time period, the voltage controller gradually decreases the applied voltage, and wherein, when the drive voltage of the sensor is restored from an abnormally decreased state to a normal state while the applied voltage to the electric motor is gradually decreased, the voltage controller gradually increases that applied voltage.

4. The steering apparatus controller for an electric power steering apparatus according to claim 1, wherein power is supplied to the electric motor via a power discontinuing device.

5. A steering apparatus controller for an electric power steering apparatus, wherein the steering apparatus controller executes a feedback control of an applied voltage to an electric motor, which electric motor generates assist torque for assisting steering of a steering wheel, said assist torque being based on a detection result of an actual current that flows through the electric motor, the steering apparatus controller comprising:
  a sensor for detecting the actual current; and
  a voltage controller, wherein when said voltage controller detects an abnormal decrease of a drive voltage for the sensor, the voltage controller maintains the applied voltage to the electric motor at a drive voltage value present at a predetermined time before the detection of the abnormally decreased drive voltage, wherein the voltage controller includes a motor drive circuit, a current command value calculator, a current controller, and a PWM calculator, wherein the motor drive circuit generates actual current that flows through the electric motor, wherein the current command value calculator calculates the present current command value based on the steering torque and the vehicle speed, wherein the current controller computes the current command value of the normal state based on the present current command value and the value of the actual current detected by said sensor, and wherein the PWM calculator performs a PWM calculation based on the current command value of the normal state and sends the calculation result to the motor drive circuit as a drive voltage command value.

6. A steering apparatus controller for an electric power steering apparatus, wherein the electric power steering apparatus includes an electric motor for generating assist torque for assisting steering of a steering wheel of a vehicle, wherein an actual current that flows through the electric motor is detected by an actual current sensor, and wherein the steering apparatus controller executes a feedback control of an applied voltage to the electric motor based on a detection result of an actual current that flows through the electric motor, the steering apparatus controller comprising:
  a motor drive circuit for driving the electric motor;
  a torque sensor for detecting a steering torque for steering the steering wheel;

a vehicle speed sensor for detecting a speed of the vehicle;

a current command value calculator for calculating a present current command value based on the detected steering torque and the detected vehicle speed;

a current controller for receiving the actual current value detected by the actual current sensor and computing a current command value of a normal state based on the present current command value and the detected actual current value to generate assist torque corresponding to the detected steering torque and the detected vehicle speed; and a PWM calculator for performing a PWM calculation based on the current command value of the normal state and sending the calculation result to the motor drive circuit as a drive voltage command value, wherein the steering apparatus controller controls the electric motor via the motor drive circuit according to the drive voltage command value to obtain assist torque of the motor in accordance with the detected steering torque and the detected vehicle speed, and wherein, when said actual current sensor detects an abnormal decrease of a drive voltage of the sensor, the voltage controller maintains the applied voltage to the electric motor to a drive voltage at a predetermined time before the drive voltage abnormally decreased.

7. A controlling method for an electric power steering apparatus, wherein a steering apparatus controller executes a feedback control of an applied voltage to an electric motor, which electric motor generates assist torque for assisting steering of a steering wheel, based on a detection result of an actual current that flows through the electric motor, said detected actual current being detected by a sensor, the method comprising:

applying a drive voltage to the sensor;

detecting an abnormal decrease of the drive voltage applied to said sensor; and wherein, when detecting an abnormal decrease of the drive voltage applied to the sensor, maintaining the applied drive voltage to the electric motor at a drive voltage present at a predetermined time before the detected abnormal decrease of the drive voltage.

8. A recording medium, which has recorded on it a program for an electric power steering apparatus, wherein the program can be read and written by a computer, and wherein the program executes a feedback control of an applied voltage to an electric motor, which electric motor generates assist torque for assisting steering of a steering wheel, based on a detection result of an actual current that flows through the motor, said detected actual current being detected by a sensor, the control program comprising:

applying a drive voltage to the sensor;

detecting an abnormal decrease of the drive voltage applied to said sensor; and wherein, when detecting an abnormal decrease of the drive voltage applied to the sensor, maintaining the applied drive voltage to the electric motor at a drive voltage present at a predetermined time before the detected abnormal decrease of the drive voltage.

* * * * *